United States Patent
Kreuchauf et al.

(10) Patent No.: US 9,641,282 B2
(45) Date of Patent: May 2, 2017

(54) RADIO COMMUNICATION DEVICES AND METHODS FOR CONTROLLING A RADIO COMMUNICATION DEVICE

(71) Applicant: Intel Mobile Communications GmbH, Neubiberg (DE)

(72) Inventors: Juergen Kreuchauf, San Francisco, CA (US); Tilman Giese, Munich (DE); Thorsten Clevorn, Munich (DE); Tobias Scholand, Muehlheim (DE); Ulrich Mennchen, Poing (DE)

(73) Assignee: INTEL DEUTSCHLAND GMBH, Neubiberg (DE)

( * ) Notice: Subject to any disclaimer, the term of this patent is extended or adjusted under 35 U.S.C. 154(b) by 161 days.

(21) Appl. No.: 13/769,424

(22) Filed: Feb. 18, 2013

(65) Prior Publication Data

US 2014/0233403 A1 Aug. 21, 2014

(51) Int. Cl.
*H04L 1/00* (2006.01)

(52) U.S. Cl.
CPC .......... *H04L 1/0002* (2013.01); *H04L 1/0007* (2013.01); *H04L 1/0034* (2013.01); *Y02B 60/31* (2013.01)

(58) Field of Classification Search
CPC ... H04L 1/0026; H04L 1/1829; H04L 1/0002; H04L 1/0007; H04L 1/0025; H04L 1/1809; H04L 47/2408; H04L 5/0091; H04B 7/264; H04W 24/00; H04W 24/02; H04W 28/0236; H04W 28/04; H04W 28/22
USPC ............................ 370/254–350; 709/201–213
See application file for complete search history.

(56) References Cited

U.S. PATENT DOCUMENTS

| | | | |
|---|---|---|---|
| 8,204,023 B2* | 6/2012 | Kim et al. ................... | 370/332 |
| 8,422,464 B2* | 4/2013 | Friedman et al. ............ | 370/333 |
| 8,654,744 B2* | 2/2014 | Kuroda et al. ............... | 370/335 |
| 2006/0034226 A1* | 2/2006 | Gu ...................... | H04W 52/146 370/332 |
| 2006/0203765 A1 | 9/2006 | Laroia et al. | |
| 2007/0019567 A1* | 1/2007 | Padovani et al. ............ | 370/252 |
| 2009/0201885 A1 | 8/2009 | Kuroda et al. | |
| 2011/0053631 A1* | 3/2011 | Bottomley ............ | H04W 52/08 455/522 |
| 2013/0107730 A1* | 5/2013 | Ankel et al. .................. | 370/252 |

* cited by examiner

*Primary Examiner* — Ayaz Sheikh
*Assistant Examiner* — Debebe Asefa
(74) *Attorney, Agent, or Firm* — Viering, Jentschura & Partner mbB

(57) ABSTRACT

A radio communication device may include: a transmitter configured to transmit data at a data rate which is based on a pre-determined maximum data rate which is pre-determined by another radio communication device; a determination circuit configured to determine a quality indicator which is indicative of a quality of the transmission of the data; and a data rate changing circuit configured to change the data rate to a changed data rate based on the determined quality indicator. The transmitter may further transmit at the changed data rate.

23 Claims, 10 Drawing Sheets

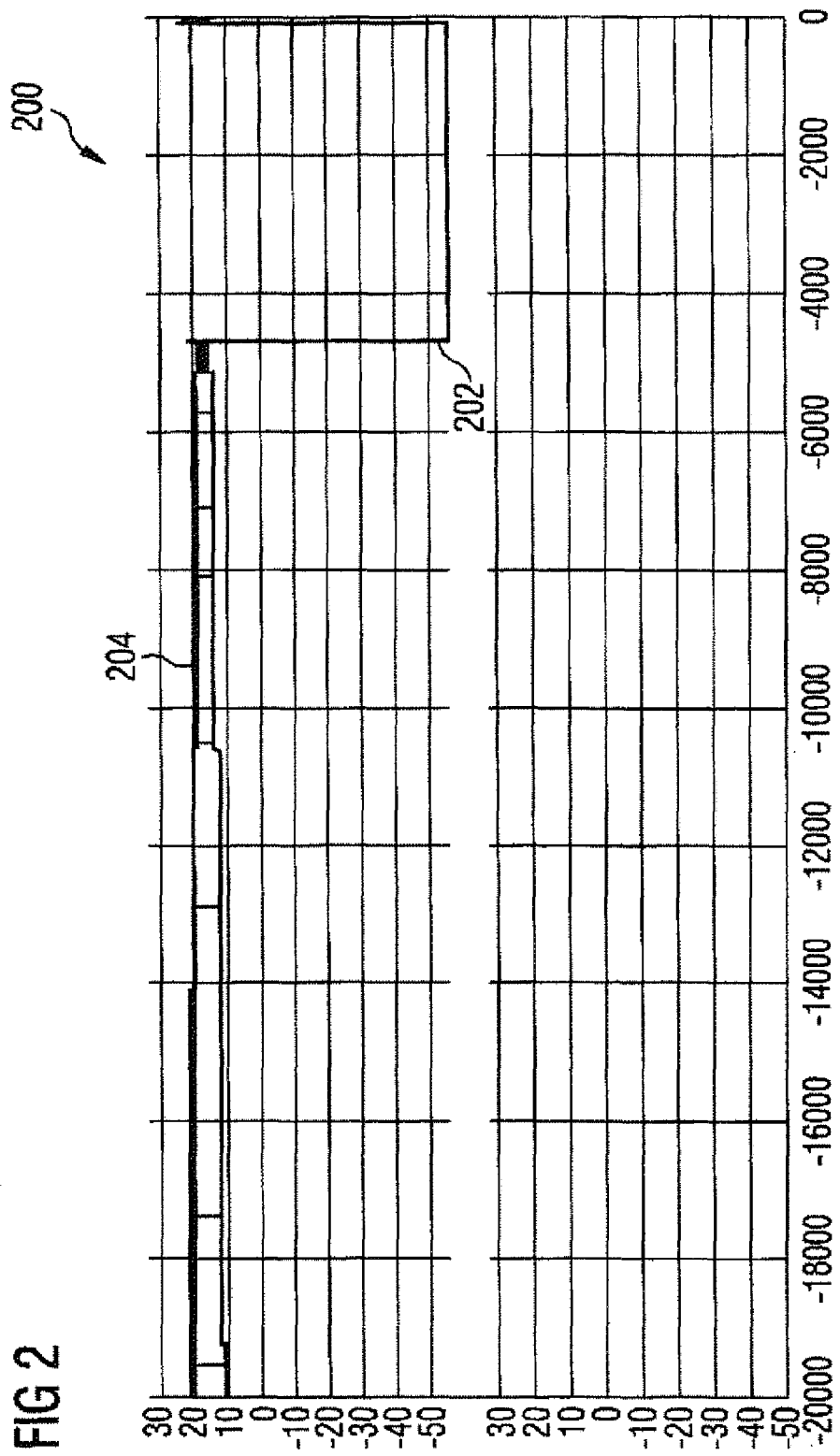

RADIO COMMUNICATION DEVICES AND METHODS FOR CONTROLLING A RADIO COMMUNICATION DEVICE

TECHNICAL FIELD

Aspects of this disclosure relate generally to radio communication devices and methods for controlling a radio communication device.

BACKGROUND

Radio communication devices may transmit data at different data rates. A radio communication device may wish to transmit data at highest data rate. However, the radio communication device may desire to reliably transmit data. Thus, there may be a need for a radio communication device which transmits data at a highest possible data rate, but yet transmit the data reliably.

SUMMARY

A radio communication device may include: a transmitter configured to transmit data at a data rate which is based on a pre-determined maximum data rate which is pre-determined by another radio communication device; a determination circuit configured to determine a quality indicator which is indicative of a quality of the transmission of the data; and a data rate changing circuit configured to change the data rate to a changed data rate based on the determined quality indicator. The transmitter may further transmit at the changed data rate.

A method for controlling a radio communication device may include: transmitting data at a data rate which is based on a pre-determined maximum data rate which is pre-determined by another radio communication device; determining a quality indicator which is indicative of a quality of the transmission of the data; changing the data rate to a changed data rate based on the determined quality indicator; and transmitting at the changed data rate.

A radio communication device may include: a transmitter configured to transmit data using a data block size which is based on a pre-determined maximum data block size which is pre-determined by another radio communication device; a determination circuit configured to determine a quality indicator which is indicative of a quality of the transmission of the data; and a data block size changing circuit configured to change the data block size to a changed data block size based on the determined quality indicator. The transmitter may transmit at the changed data block size.

A method for controlling a radio communication device may include: transmitting data using a data block size which is based on a pre-determined maximum data block size which is pre-determined by another radio communication device; determining a quality indicator which is indicative of a quality of the transmission of the data; changing the data block size to a changed data block size based on the determined quality indicator; and transmitting at the changed data block size.

BRIEF DESCRIPTION OF THE DRAWINGS

In the drawings, like reference characters generally refer to the same parts throughout the different views. The drawings are not necessarily to scale, emphasis instead generally being placed upon illustrating the principles of various aspects of this disclosure. In the following description, various aspects of this disclosure are described with reference to the following drawings, in which:

FIG. 2 shows a diagram illustrating transmit power allocation;

DESCRIPTION

Figure 1:
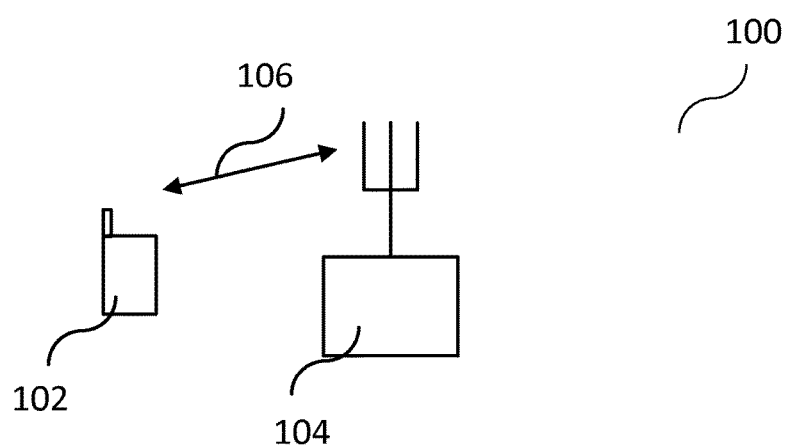
FIG. 1 shows a mobile radio communication system.

The following detailed description refers to the accompanying drawings that show, by way of illustration, specific details and aspects of the disclosure in which the invention may be practiced. Other aspects of the disclosure may be utilized and structural, logical, and electrical changes may be made without departing from the scope of the invention. The various aspects of the disclosure are not necessarily mutually exclusive, as some aspects of the disclosure may be combined with one or more other aspects of the disclosure to form new aspects of the disclosure.

The terms "coupling" or "connection" are intended to include a direct "coupling" or direct "connection" as well as an indirect "coupling" or indirect "connection", respectively.

The word "exemplary" is used herein to mean "serving as an example, instance, or illustration". Any aspect of this disclosure or design described herein as "exemplary" is not necessarily to be construed as preferred or advantageous over other aspect of this disclosure or designs.

The term "protocol" is intended to include any piece of software, that is provided to implement part of any layer of the communication definition.

A radio communication device may be an end-user mobile device (MD). A radio communication device may be any kind of mobile radio communication device, mobile telephone, personal digital assistant, mobile computer, or any other mobile device configured for communication with another radio communication device, a mobile communication base station (BS) or an access point (AP) and may be also referred to as a User Equipment (UE), a mobile station (MS) or an advanced mobile station (advanced MS, AMS), for example in accordance with IEEE 802.16m.

A radio base station may be a radio base station operated by a network operator (which may also be referred to as a legacy base station), e.g. a NodeB or an eNodeB, or may be a home base station, e.g. a Home NodeB, e.g. a Home (e)NodeB. In an example, a 'Home NodeB' may be understood in accordance with 3GPP (Third Generation Partnership Project) as a trimmed-down version of a cellular mobile radio base station optimized for use in residential or corporate environments (e.g., private homes, public restaurants or small office areas). Femto-Cell Base Stations (FC-BS) may be provided in accordance with a 3GPP standard, but may also be provided for any other mobile radio communication standard, for example for IEEE 802.16m.

The radio communication device may include a memory which may for example be used in the processing carried out by the radio communication device. A memory may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, for example, a floating gate memory, a charge trapping memory, an MRAM (Magnetoresistive Random Access Memory) or a PCRAM (Phase Change Random Access Memory).

As used herein, a "circuit" may be understood as any kind of a logic implementing entity, which may be special purpose circuitry or a processor executing software stored in a memory, firmware, or any combination thereof. Furthermore, a "circuit" may be a hard-wired logic circuit or a programmable logic circuit such as a programmable processor, for example a microprocessor (for example a Complex Instruction Set Computer (CISC) processor or a Reduced Instruction Set Computer (RISC) processor). A "circuit" may also be a processor executing software, for example any kind of computer program, for example a computer program using a virtual machine code such as for example Java. Any other kind of implementation of the respective functions which will be described in more detail below may also be understood as a "circuit". It may also be understood that any two (or more) of the described circuits may be combined into one circuit.

Description is provided for devices, and description is provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein.

Devices and methods may be provided for adapting E-TFCI (E-DCH (Enhanced Dedicated Channel) Transport Format Combination Identifier, which may also be referred to as ETFCI) and E-DPDCH (E-DCH Dedicated Physical Data Channel) power levels in varying radio condition to optimize throughput (balance TB (transmission block) size vs (versus) retransmissions).

The E-TFCI may indicate a data block size, for example a transmission block size, for example transmitted per transmission time interval. A higher E-TFCI may represent a larger data block size, and may thus represent a higher data rate.

FIG. 1 shows a mobile radio communication system 100. A radio communication device 102 may receive a signal from a first base station 104, for example wirelessly like indicated by arrow 106.

Radio communication devices may transmit data at different data rates. A radio communication device may wish to transmit data at highest data rate. However, the radio communication device may desire to reliably transmit data. Thus, there may be a need for a radio communication device which transmits data at a highest possible data rate, but yet transmit the data reliably.

According to 3GPP (Third Generation Partnership Project), for PS (packet switched) data traffic in Uplink with E-DCH (HSUPA) (High Speed Uplink Packet Access), in case there is enough data to be sent from application layer (which may mean that TX (transmission) buffers are full and the network gives the UE a high enough grant which the network uses to change the scheduling of E-TFCI and transmit power levels for E-DCH), the UE may always send with high TX power close to the maximum allowed in its power class (for example power class 3 with 24 dBm). This is illustrated in FIG. 2.

FIG. 2 shows a diagram 200 illustrating TX (transmit) power allocation 204 in HSUPA over varying DPCCH (Dedicated Physical Control CHannel) 202.

Depending on how much of the overall power budget is already allocated for the higher priority channels (e.g. DPCCH), the remaining power may be mapped on a certain E-TFCI from the configured reference E-TFCI table, like shown in FIG. 3A and FIG. 3B (which will be described in more detail below): the network may configure reference E-TFCIs together with a power level for each of these for these E-TFCIs. All other E-TFCIs in between and their respective power levels may be calculated by extrapolation or interpolation, i.e. not only the reference ETFCIs may be selected, but also any E-TFCI/power level may be selected in which the data to be transmitted fits best (always considering the max power and the grant).

Figure 3A:
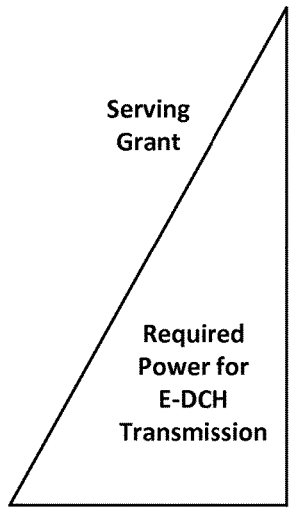
FIG. 3A and FIG. 3B show diagrams illustrating different data rates and transmit power setting for a radio communication device.
Figure 3B:
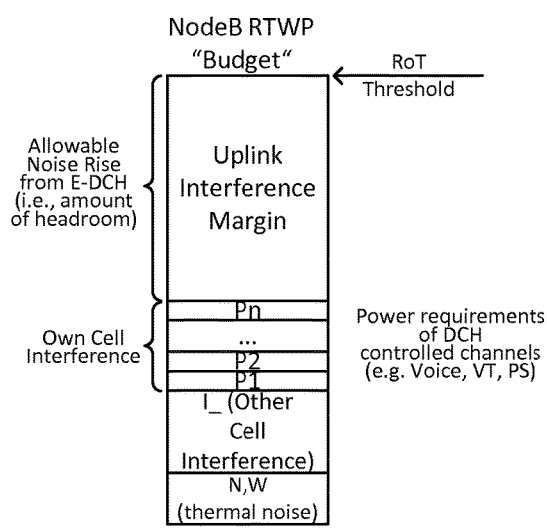

FIG. 3A shows a diagram 300 illustrating a dependency of available TX power for E-DCH and E-TFCI to select. FIG. 3B shows a diagram 302 illustrating a NodeB RTWP (Received Total Wideband Power) budget.

The NodeB may measure the UL quality and may increase the power allocated to the DPCCH if needed. High power on DPCCH may indicate degraded UL (uplink) quality.

The problem may be that, even if the available power budget indicates the opportunity to send high data rates on the Physical Layer in UL, for example due to the randomness (for example fading) and the sensitive (for example degraded UL) conditions, the channel may not be able to carry out these high data rates consistently. This might lead loss of packets in RLC (Radio Link Control) by being removed by Physical Layer when CRCs (cyclic redundancy checks, for example CRC errors) are detected.

The throughput may be lower when there are retransmissions on EDCH (Enhanced Dedicated Channel, which may also be referred to as E-DCH)). For example, if each EDCH PDU (Protocol Data Unit) has to be retransmitted 1 time on EDCH, the throughput may be already degrades to 50%. If the maximum number of retransmissions on EDCH is configured to a small value (e.g. 3), the PDU might be discarded in MAC (Media Access Control) and there may be RLC retransmissions.

Commonly used devices and methods provide processing on the network side, where the network can change the scheduling by changing the grant and so also maybe avoid a high retransmission rate. However, according to commonly used devices and methods, the UE may not actively do something.

Devices and methods may be provided which may not only reduce the ETFCI (which would be the effect when the grant is reduced), but may also keep the power to make it more likely that the smaller ETFCI is received without retransmissions.

Assuming the UE has sufficient data to transmit (for example when the TX (transmit) buffer is full), and the maximum E-TFCI configured by the reference E-TFC table allows the UE to go to maximum TX power. Even if the available power budget would allow Physical Layer UL to transmit high bit rate data, for example high E-TFCI selected by MAC from reference ETFC table, in varying (for example attenuation or fading) UL conditions, rather a more conservative assessment may be made by having MAC selecting a lower E-TFCI than actually possible and leave the TX power associated for E-DPDCH constant to make the bit rate, even if lower, but more robust against the varying UL conditions.

Figure 4:
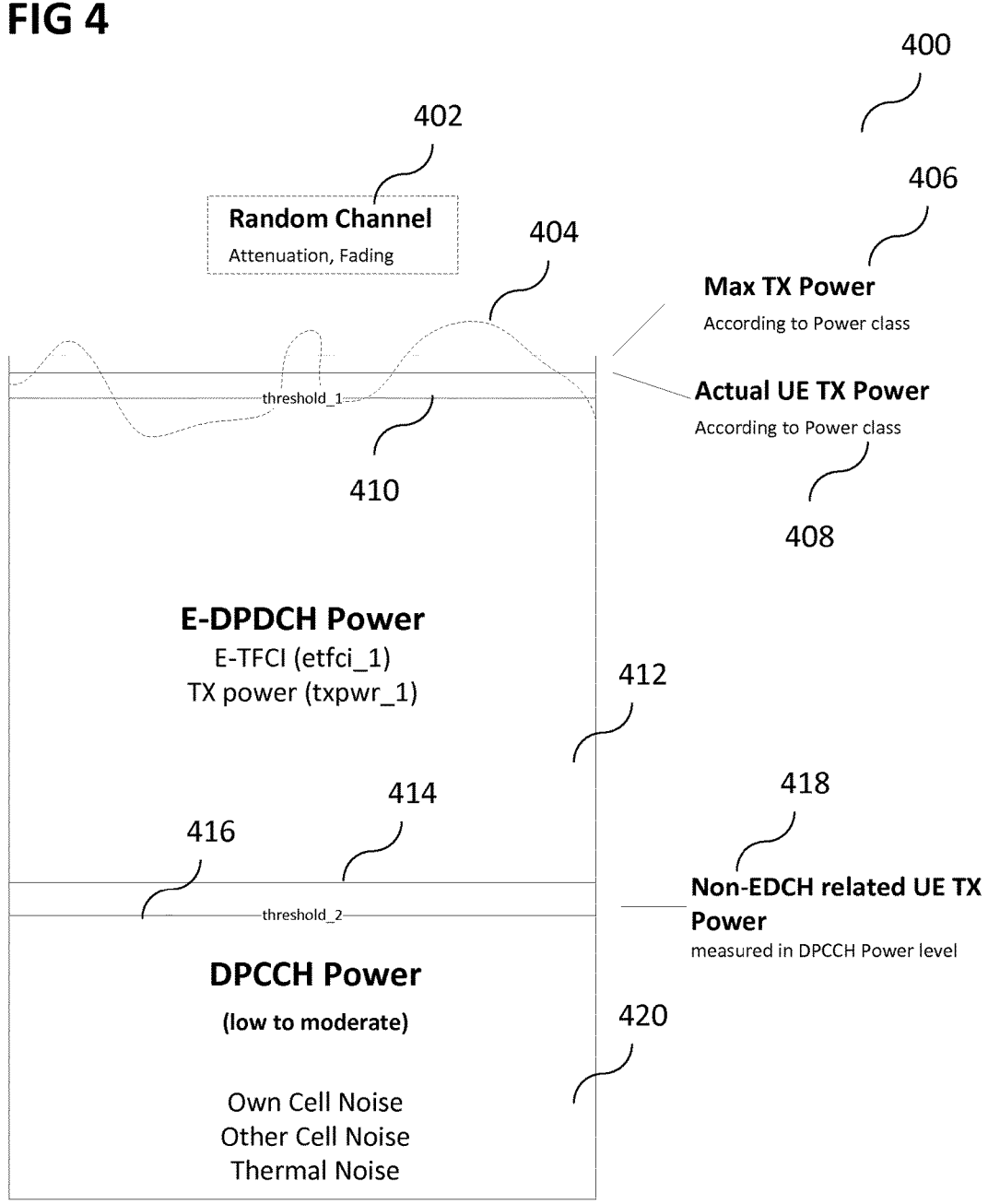
FIG. 4 and FIG. 6 show diagrams illustrating transmit power and noise level distribution.

FIG. 4 shows a diagram 400 illustrating a TX power and noise levels distribution for Physical UL channels and various thresholds. A random channel 402 may be provided, like shown as a curve 404 over time. The maximum transmit power 406 of the UE is shown. The actual transmit power 408 of the UE is shown. The rectangular shaped boxes in FIG. 4 give static, simplified and problem tailored properties. This may be overlaid with the dashed line 404, which may illustrate that the physical channel during the static allocation of the Tx Power still may vary. This may be mitigated by various devices and methods described. A difference to FIG. 6 like will be described below may be that the DPCCH Power may be low, and thus may not be on risk. Devices and methods may be provided to make the E-DPDCH (for example the actual UL data) more robust).

For example, the following relevant parameters may be evaluated:

The UE may transmit over a maximum TX threshold or close to a maximum TX power (which may be referred to as a first threshold, or threshold_1 (410));

The DPCCH power may be below a second threshold threshold_2 (416).

Retransmission may occur with a rate of retr_rate=packet_retr/packet_all above a third threshold threshold_3.

The E-DPDCH Power 412 (shown between a line 414 and the first threshold 410), and the DPCCH power 420 (shown from the bottom of FIG. 4 to the second threshold 416) are illustrated. Non-EDCH related UE TX power 418 is shown.

Figure 5:
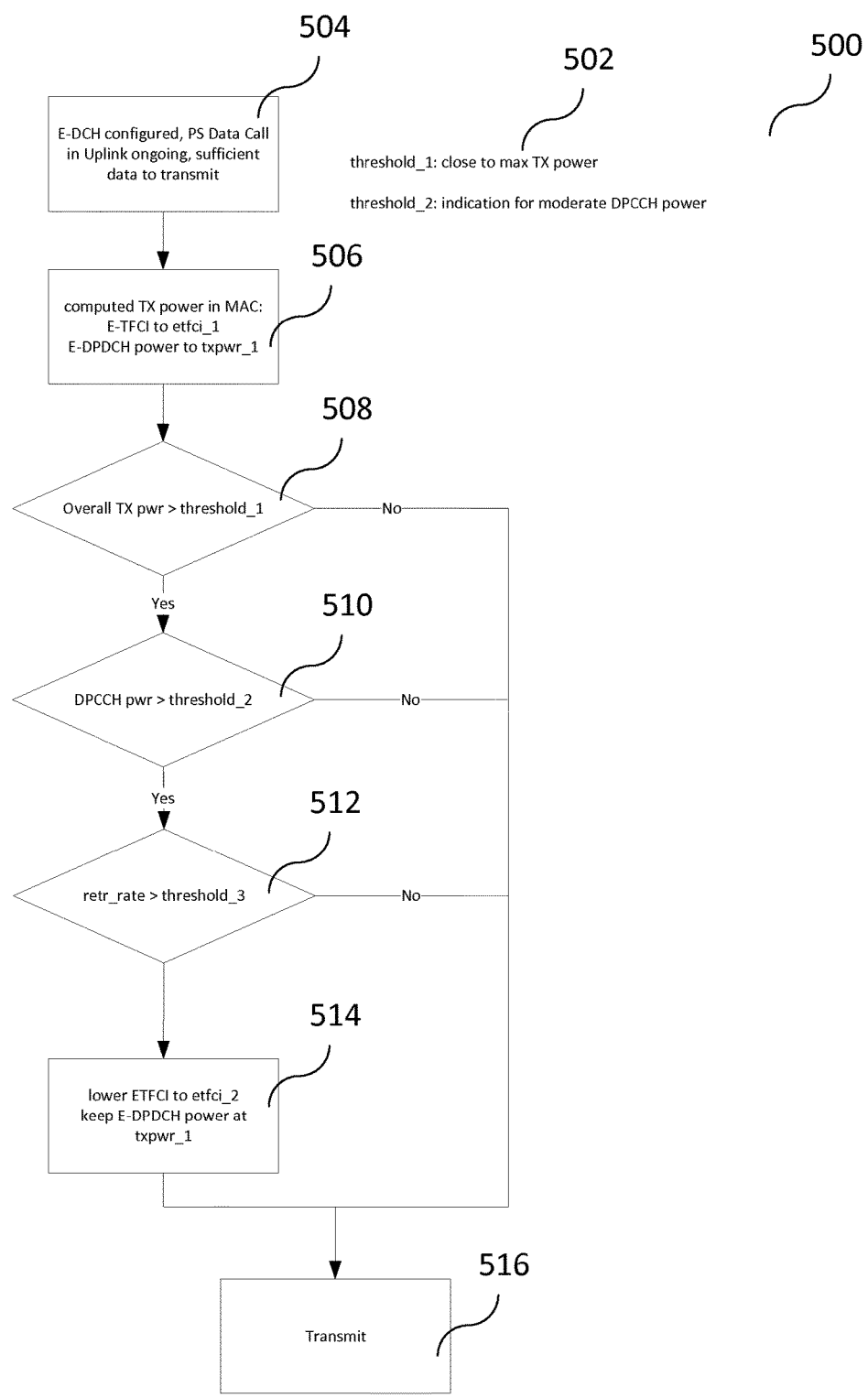
FIG. 5 and FIG. 7 show flow diagrams illustrating a method for controlling a radio communication device.

FIG. 5 shows a flow diagram 500 for E-TFCI and TX power decision under the considered conditions. Like indicated by 502, a first threshold threshold_1 may be close to a maximum TX power, and a second threshold threshold_2 may provide an indication for moderate DPCCH power. In 504, the E-DCH may be configured, a PS data call in uplink may be ongoing, and there may be sufficient data to transmit.

In 506, the computed TX power in MAC may provide that the E-TFCI is set to a first E-TFCI_etfci_1 (providing a first block size and thus a first data rate), and that the E-DPDCH power is set to a first transmission power txpwr_1.

In 508, the UE may determine whether the overall transmission power is above the first threshold. If the UE determines that the overall transmission power is above the first threshold, processing may proceed in 510. If the UE determines that the overall transmission power is not above the first threshold, processing may proceed in 516.

In 510, the UE may determine whether the DPCCH power is above the second threshold. If the UE determines that the DPCCH power is above the second threshold, processing may proceed in 512. If the UE determines that the DPCCH power is not above the second threshold, processing may proceed in 516.

In 512, the UE may determine whether a retransmission rate is above a third pre-determined threshold. If the UE determines that the retransmission rate is above the third threshold, processing may proceed in 514. If the UE determines that the retransmission rate is not above the third threshold, processing may proceed in 516.

In 514, the UE may lower the data rate. For example, the UE may set the ETFCI to a lower value etfci_2. Furthermore, the UE may keep the E-DPDCH power at txpwr_1.

In 516, the UE may transmit the data.

Like shown in FIG. 5, the devices and methods provided may apply the following mechanism:

a) Lower E-TFCI to etfci_2 (wherein etfci_2<etfci_1). This may reduce the TrBl (transmission block) size.

b) Keep E-DPDCH power to txpwr_1 to give same TX power to lower number of bits in TrBl from a).

Devices and methods may be provided which adapt (or change; for example reduce) the UL E-DCH data rate by choosing lower E-TFCI, TrBl (transmission block) size under the condition of observing a certain amount of Retransmissions in actually good TX conditions.

This may reduce UL throughput on Physical Layer.

By giving the same amount of TX power (E-DPDCH power) to this less bits may make the smaller TrBl size bits more robust.

This may avoid retransmissions.

The devices and methods provided may reach and exceed a break-even point of smaller TrBl size vs (versus) less retransmission.

The overall packets in UL transmitted may be higher.

The devices and methods provided may increase the PS throughput in UL in these exemplary conditions.

FIG. 2 as described above shows UE fulfilling threshold 1 by permanently being around maximum TX power in E-DCH operation.

Table 1 shows degrading T-Put (which may be a measured throughput, and which may be an output of the test setup), CDP (Code Domain Power; this may indicate how L1 (layer 1) may reduce the power of the HSUPA data channel (E-DPDCH) only; there may be room for implementational variations according to 3GPP) and E-TFCI (which may be a value chosen in the UE MAC, and which may be an output of the test setup) around DPCCH power (which may be set at the tester) lower than about 10 dBm. With any DPCCH power lower than a threshold to be found or optimized (for example threshold_2) and retransmission occurring, the mechanism of selecting a lower E-TFCI and E-DPDCH will be executed. The UE target power (which may be referred to the transmit power of 3GPP 25.101, section 6.2) may be set at the tester.

TABLE 1

Measured T-Put, CDP, E-TFCI on Agilent 8960 in use case conditions

| UE Target Power | Throughput, kbps | CDP | DPCCH Power | ETFCI |
|---|---|---|---|---|
| 10 | 5742 | −8.04 | 3.5 | 127 |
| 11 | 5742 | −8.04 | 4.5 | 127 |
| 12 | 5742 | −8.04 | 5.5 | 127 |
| 13 | 5742 | −8.04 | 6.5 | 127 |
| 14 | 5742 | −8.04 | 7.5 | 127 |
| 15 | 5742 | −8.04 | 8.5 | 127 |
| 16 | 5537 | −8.33 | 9.5 | 126 |
| 17 | 3586 | −8.9 | 10.5 | 119 |
| 18 | 2784 | −9.35 | 11.5 | 114 |
| 19 | 2240 | −9.45 | 12.5 | 107 |
| 20 | 1738 | −10.75 | 12.5 | 101 |
| 21 | 0 | −55.1 | 13.5 | 94 |
|  |  |  | 15.5 | 0 |

In Table 1, the underlined lines "UE Target Power"=16/17 indicate that in this area, the ETFCI starts to get reduced, until like shown in underlined lines 20 and 21, it goes down to 0. This may be the ballpark where the devices and methods provided may optimize with a more aggressive reduction of ETFCI.

A difference between the devices and methods provided and commonly used devices and methods may be observed for example as follows, for example in a Lab NodeB setup:
  a) setup E-DCH (HSUPA data call);
  b) degrade UL until E-TFCI starts to be reduced (e.g. DPCCH power around 10 dBm), a lower bit rate is observed;
  c) leave DPCCH constant and decrease quality on E-DPCCH (for example attenuation or fading);
  This will lead to an observation of retransmission and lower T-Put.
  d) Until a certain threshold of E-DPCCH quality, both UE (the one provided and the one commonly used) may behave the same.
  e) After reaching this threshold, the commonly used UE may observe lower throughput than the UE provided, having selected higher E-TFCI (TrBl size).

Devices and methods may be provided to adapt E-TFCI and E-DPDCH power levels in marginal UL conditions to improve PS call stability.

In situation where the power headroom for EDCH is so small that transmissions only can be done with the smallest E-TFCI allowing to send 1 PDU, EDCH transmission with the minimum set E-TFCI may always be allowed regardless of the available power headroom. The power headroom might not even be sufficient for that what can't be prevented.

An example may be considered where minimum set E-TFCI has not been reached yet (e.g. still possible to send 2 PDUs but exceed the TX power frequently due to the varying conditions, like also will be described in more detail below.

The UE may have sufficient data to transmit (for example the TX buffer may be full), and the maximum E-TFCI configured by the reference E-TFC table may allow the UE to go to maximum TX power. Even if the available power budget would allow Physical Layer UL to transmit at a certain bit rate for this situation, i.e. E-TFCI selected by MAC from reference ETFC table, for example in this case still far away from maximum E-TFCI, in degraded UL conditions, the UE may make a more conservative assessment by having MAC selecting a lower E-TFCI than actually possible.

Figure 6:
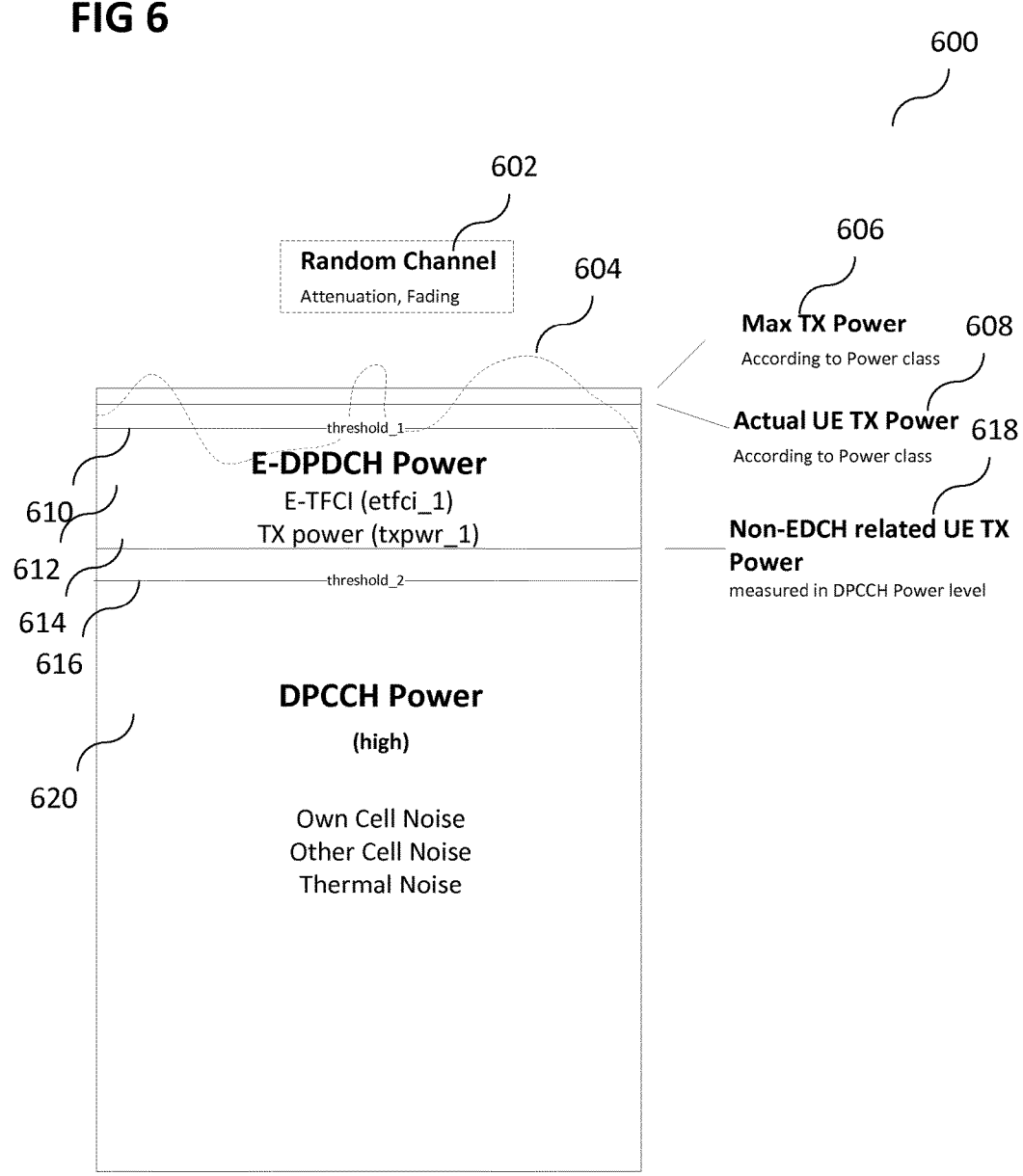

FIG. 6 shows a diagram 600 illustrating a TX power and noise levels distribution for Physical UL channels and various thresholds. A random channel 602 may be provided, like shown as a curve 604 over time. The maximum transmit power 606 of the UE is shown. The actual transmit power 608 of the UE is shown.

For example, the following relevant parameters may be evaluated:
  The UE may transmit over a maximum TX threshold or close to a maximum TX power (which may be referred to as a first threshold, or threshold_1 (610));
  The DPCCH power may be over a threshold (and for example still the E-TFCI may already be close to min), this may be referred to as "marginal" UL conditions).
  A second threshold threshold_2 (616) may be provided.
  An EDCH discard rate may refer to a maximum number of retransmissions causing RLC retransmission.
  The E-DPDCH Power 612 (shown between a line 614 and the first threshold 610), and the DPCCH power 620 (shown from the bottom of FIG. 6 to the second threshold 616) are illustrated. Non-EDCH related UE TX power 618 is shown. Similar to FIG. 4 above, the static case may be illustrated by boxes in FIG. 6, while the dashed line 604 may illustrate that the physical channel during the static allocation of the Tx Power still may vary. In contrast to what is shown in FIG. 4 above, the DPCCH power may be relatively high, and devices and methods may be provided to strengthen that one. In this marginal conditions with varying channel, loss of DPCCH signaling may end up in call drops (for example CS (circuit switched)/Voice or PS (packet switched)) instead of low data rates.

Figure 7:
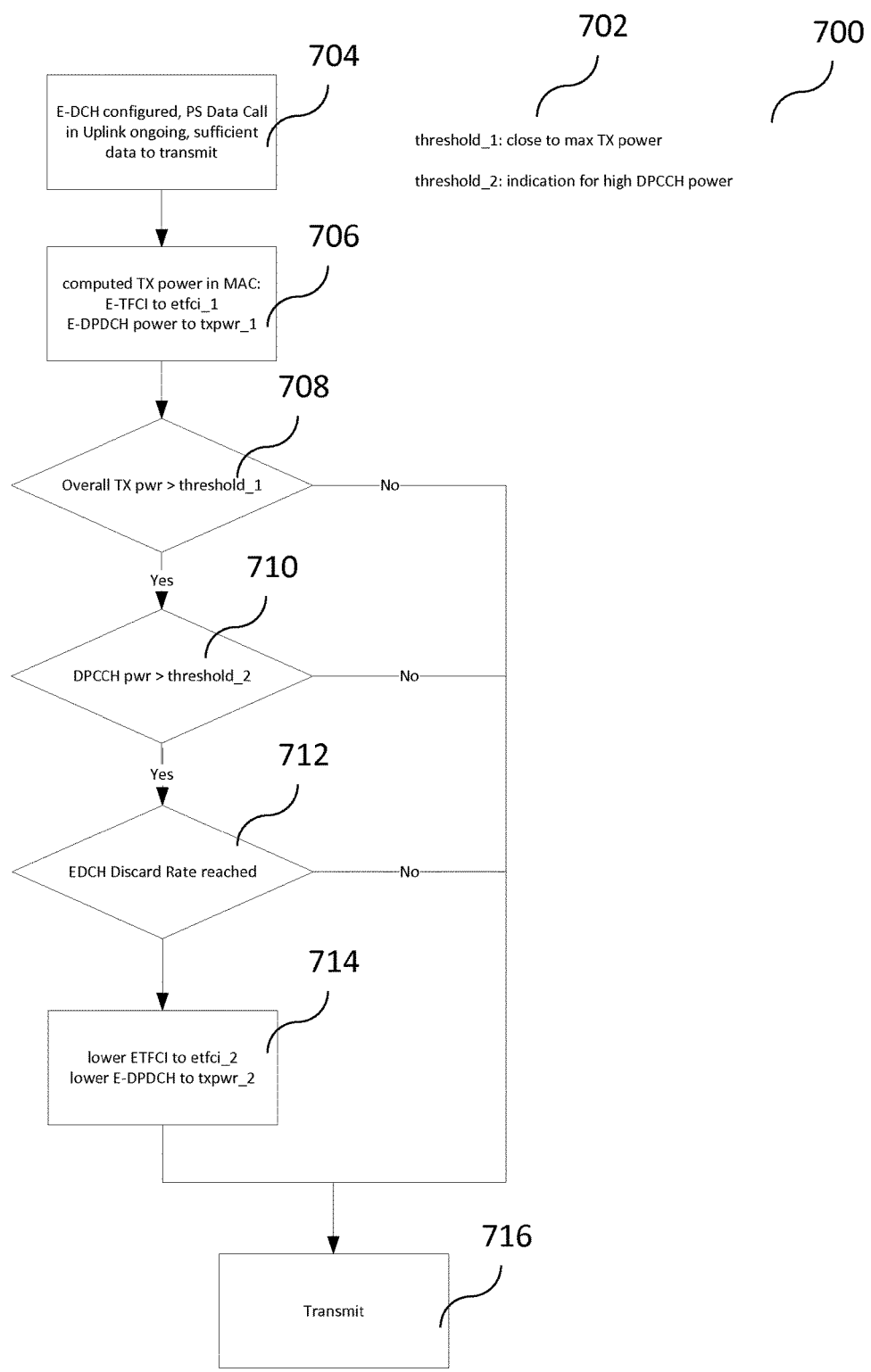

FIG. 7 shows a flow diagram 700 for E-TFCI and TX power decision under the considered conditions. Like indicated by 702, a first threshold threshold_1 may be close to a maximum TX power, and a second threshold threshold_2 may provide an indication for moderate DPCCH power. In 704, the E-DCH may be configured, a PS data call in uplink may be ongoing, and there may be sufficient data to transmit.

In 706, the computed TX power in MAC may provide that the E-TFCI is set to a first E-TFCI etfci_1 (providing a first block size and thus a first data rate), and that the E-DPDCH power is set to a first transmission power txpwr_1.

In 708, the UE may determine whether the overall transmission power is above the first threshold. If the UE determines that the overall transmission power is above the first threshold, processing may proceed in 710. If the UE determines that the overall transmission power is not above the first threshold, processing may proceed in 716.

In 710, the UE may determine whether the DPCCH power is above the second threshold. If the UE determines that the DPCCH power is above the second threshold, processing may proceed in 712. If the UE determines that the DPCCH power is not above the second threshold, processing may proceed in 716.

In 712, the UE may determine whether a retransmission rate fulfills a pre-determined criterion, for example, the UE may determine whether the EDCH discard rate is reached. If the UE determines that the retransmission rate fulfills the pre-determined criterion, processing may proceed in 714. If the UE determines that the retransmission rate does not fulfill the pre-determined criterion, processing may proceed in 716.

In 714, the UE may lower the data rate. For example, the UE may set the ETFCI to a lower value etfci_2. Furthermore, the UE may lower the E-DPDCH power to a lower value txpwr_2.

In 716, the UE may transmit the data.

Like illustrated in FIG. 7, the devices and methods provided may apply the following mechanism:
  a) lower E-TFCI to E-TFCI_2 (with E-TFCI_2<E-TFCI_1 with E-TFCI>minimum set E-TFCI);
  b) lower E-DPDCH power to txpwr_2 (wherein txpwr_2<txpwr_1).

Devices and methods provided may adapt (or change; for example reduce) UL E-DCH data rate, for example by choosing lower E-TFCI and associated TX power when UE is at marginal UL condition, which may for example mean that already low bit rates chosen but still a minimum set E-TFCI is not reached, which may mean that there may be a potential to decrease further.

Lower bit rates may help making the link more reliable, for example in two examples:
  a) For SRB (Signaling Radio Bearers) mapped to EDCH (which may depend on network configuration), there may be lower chances to lose PDUs on SRB;
  b) For PS (for example data RBs mapped to EDCH) continuously attempted to be transmitted but getting too many RLC retransmissions, the RLC may initiate a reset procedure (how many RLC retransmission the UE considers "too many" may depend on network setting for maximum RLC reset counter). In this case all RB (radio bearer) may be torn down (for example speech, data and signaling RBs).

This may improve PS/CS (circuit switched) call stability (which may for example reduce a call drop problem), for example in the condition as described above.

FIG. 2 shows UE fulfilling threshold 1 by permanently being around a maximum TX power in E-DCH operation.

Table 1 illustrated above shows degrading T-Put, CDP and E-TFCI around DPCCH Power lower than about 10 dBm. With any DPCCH power higher than a threshold to be found or optimized (for example threshold_2) and retransmission occurring, the mechanism of selecting a lower E-TFCI and E-DPDCH as described above may be executed.

A difference between the devices and methods provided and commonly used devices and methods may be observed for example as follows, for example in a Lab NodeB setup:
 a) setup E-DCH (for example a HSUPA data call);
 b) degrade UL until E-TFCI starts to be reduced (e.g. DPCCH power around 10 dBm); a lower bit rate may be observed;
 c) degrade UL (for example attenuate, fading e.g. ITU (International Telecommunication Union) pedestrian B speed 3 kmph (PB3)) further in a way to observe DPCCH increase by 1 dB; T-Put, E-TFCI and CDP may become lower;
 d) Until a certain threshold of DPCCH power, both devices (for example both UEs) may behave the same;
 e) After reaching this threshold, the UE commonly used may observe higher E-FTCI and a higher EDCH discard rate.

Figure 8:
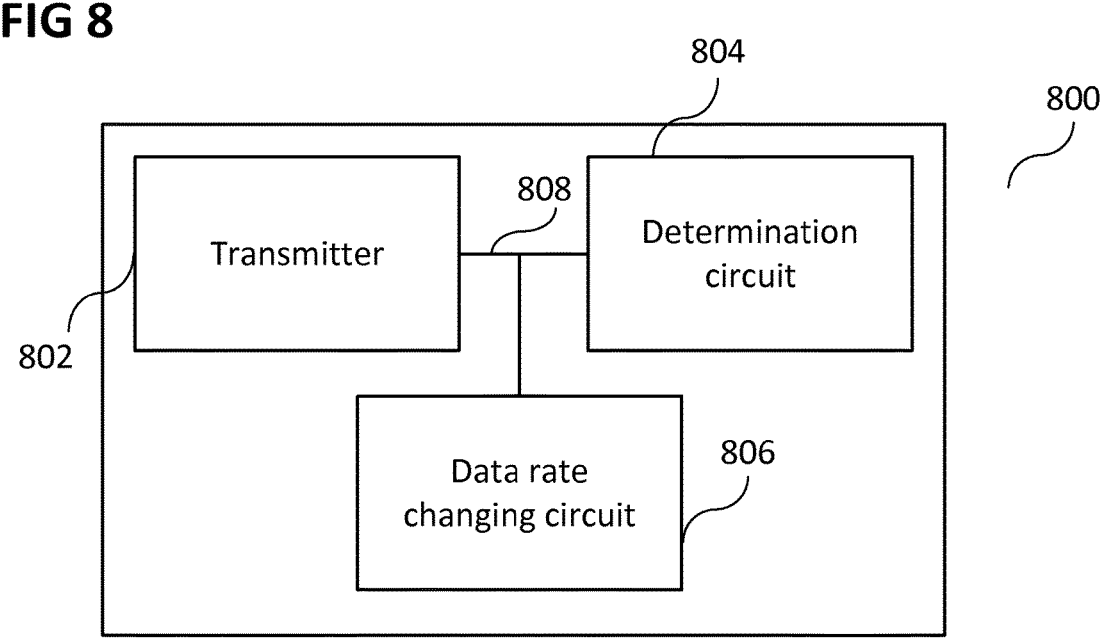
FIG. 8 shows a radio communication device with a transmitter, a determination circuit and a data rate changing circuit.

FIG. 8 shows a radio communication device 800. The radio communication device 800 may include a transmitter configured to transmit data at a data rate. The data rate may be based on a pre-determined maximum data rate. The pre-determined maximum data rate may be pre-determined by another radio communication device (not shown). The radio communication device 800 may further include a determination circuit configured to determine a quality indicator which is indicative of a quality of the transmission of the data. The radio communication device 800 may further include a data rate changing circuit 806 configured to change the data rate to a changed data rate based on the determined quality indicator. The transmitter 802 may transmit at the changed data rate. The transmitter 802, the determination circuit 804, and the data rate changing circuit 806 may be coupled with each other, for example via a connection 808, for example an optical connection or an electrical connection, such as for example a cable or a computer bus or via any other suitable electrical connection to exchange electrical signals.

The radio communication device may include or may be a mobile radio communication device. The other radio communication device may include or may be a radio base station.

The maximum data rate may be represented by a maximum transmission block size.

The quality indicator may include or may be a retransmission rate of the transmission of the data.

The data rate changing circuit 806 may reduce the data rate to the changed data rate if the quality of the transmission of the data rate is below a pre-determined threshold.

The data rate changing circuit 806 may reduce the data rate to the changed data rate if a transmission power of the transmitter is above a pre-determined threshold.

Figure 9:
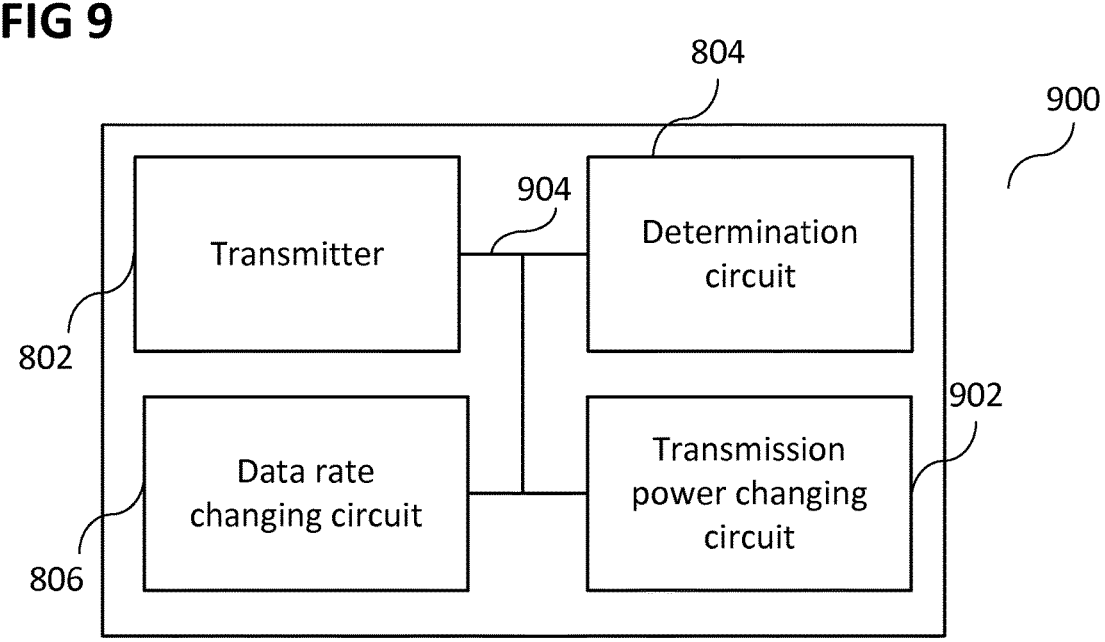
FIG. 9 shows a radio communication device with a transmitter, a determination circuit, a data rate changing circuit, and a transmission power changing circuit.

FIG. 9 shows a radio communication device 900. The radio communication device 900 may, similar to the radio communication device 800 of FIG. 8, include a transmitter 802. The radio communication device 900 may, similar to the radio communication device 800 of FIG. 8, further include a determination circuit 804. The radio communication device 900 may, similar to the radio communication device 800 of FIG. 8, further include a data rate changing circuit 802. The radio communication device 900 may further include a transmission power changing circuit 902. The transmitter 802, the determination circuit 804, the data rate changing circuit 806, and the transmission power changing circuit 902 may be coupled with each other, for example via a connection 904, for example an optical connection or an electrical connection, such as for example a cable or a computer bus or via any other suitable electrical connection to exchange electrical signals.

The transmitter 802 may transmit data at a transmission power. The transmission power may be based on a pre-determined maximum transmission power. The pre-determined maximum transmission power may be pre-determined the other radio communication device. The transmission power changing circuit 902 may change the transmission power to a changed transmission power based on the determined quality indicator. The transmitter 802 may transmit at the changed transmission power.

The transmission power changing circuit 902 may reduce the transmission power to the changed transmission power if a transmission power of the transmitter is above a pre-determined threshold.

The data rate which is based on the pre-determined maximum data rate may further be based on an amount of data to be transmitted.

The data rate which is based on the pre-determined maximum data rate may be equal to the pre-determined maximum data rate if the amount of data to be transmitted is above a pre-determined threshold.

The data rate which is based on the pre-determined maximum data rate may be smaller than or equal to the pre-determined maximum data rate.

Figure 10:
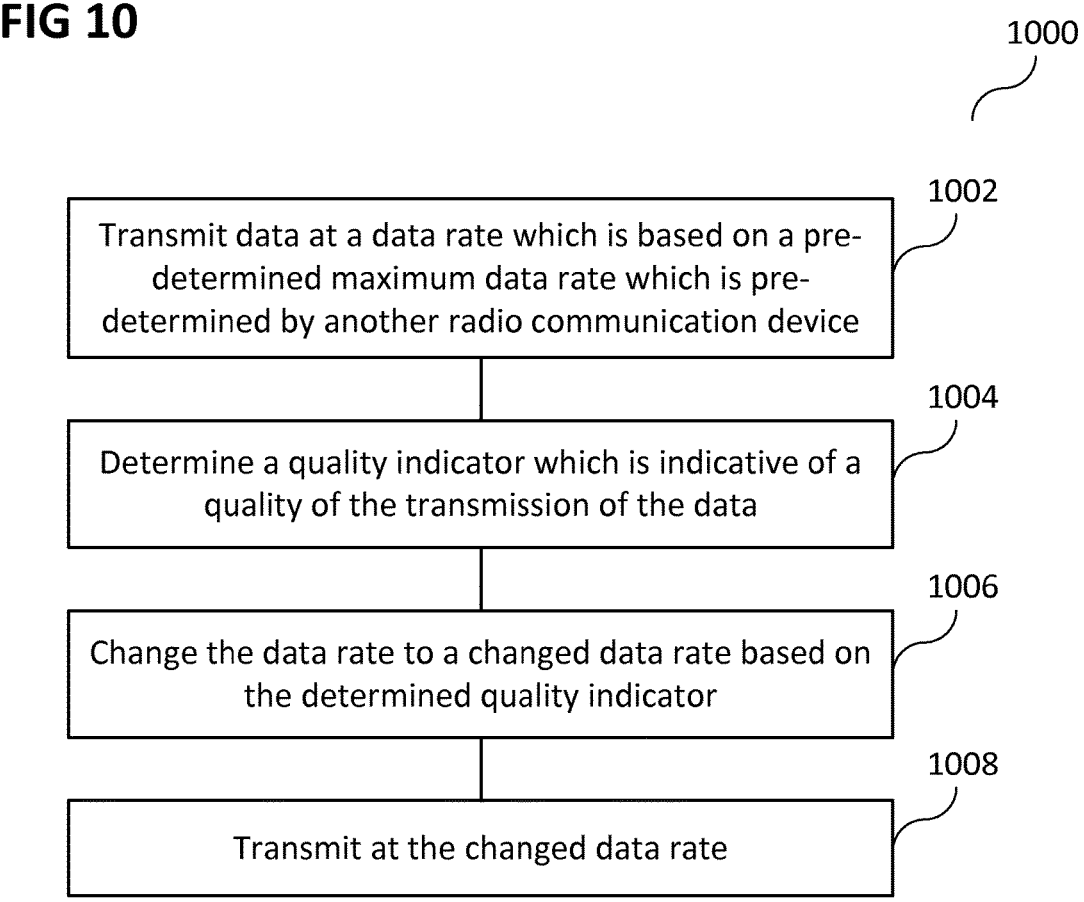
FIG. 10 shows a flow diagram illustrating a method for controlling a radio communication device, for example the radio communication device of FIG. 8.

FIG. 10 shows a flow diagram 1000 illustrating a method for controlling a radio communication device. In 1002, a transmitter of the radio communication device may transmit data at a data rate. The data rate may be based on a pre-determined maximum data rate. The maximum data rate may be pre-determined by another radio communication device. In 1004, a determination circuit of the radio communication device may determine a quality indicator which is indicative of a quality of the transmission of the data. In 1006, a data rate changing circuit of the radio communication device may change the data rate to a changed data rate based on the determined quality indicator. In 1008, the transmitter of the radio communication device may transmit at the changed data rate.

The radio communication device may include or may be a mobile radio communication device. The other radio communication device may include or may be a radio base station.

The maximum data rate may be represented by a maximum transmission block size.

The quality indicator may include or may be a retransmission rate of the transmission of the data.

The method may further include reducing the data rate to the changed data rate if the quality of the transmission of the data rate is below a pre-determined threshold.

The method may further include reducing the data rate to the changed data rate if a transmission power of the transmitter is above a pre-determined threshold.

The method may further include transmitting data at a transmission power. The transmission power may be based on a pre-determined maximum transmission power. The pre-determined maximum transmission power may be pre-determined by the other radio communication device. The method may further include changing the transmission power to a changed transmission power based on the determined quality indicator. The method may further include transmitting at the changed transmission power.

The method may further include reducing the transmission power to the changed transmission power if a transmission power of the transmitter is above a pre-determined threshold.

The data rate which is based on the pre-determined maximum data rate may further be based on an amount of data to be transmitted.

The data rate which is based on the pre-determined maximum data rate may be equal to the pre-determined maximum data rate if the amount of data to be transmitted is above a pre-determined threshold.

The data rate which is based on the pre-determined maximum data rate may be smaller than or equal to the pre-determined maximum data rate.

Figure 11:
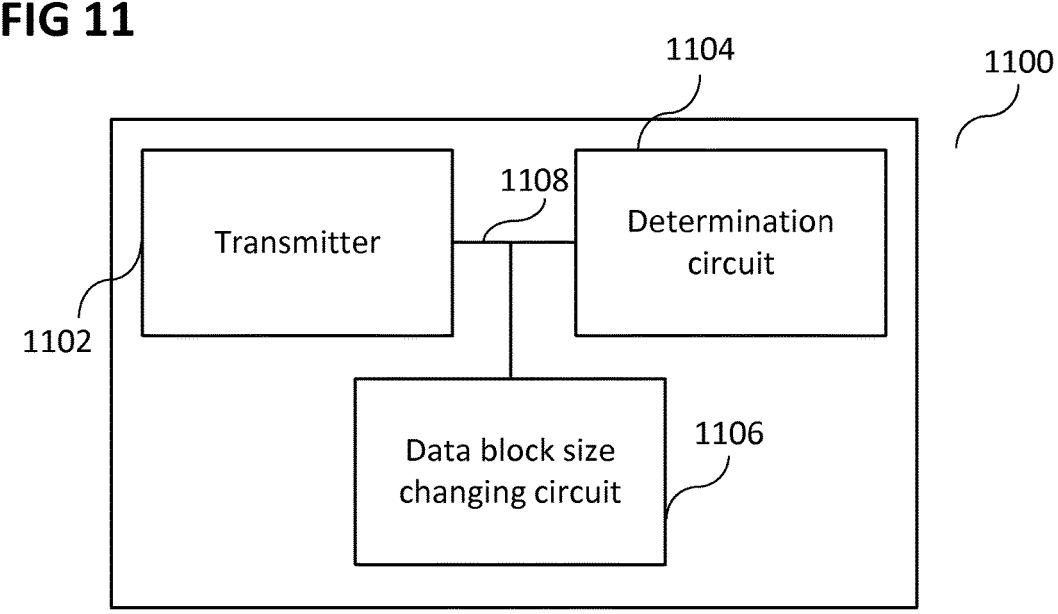
FIG. 11 shows a radio communication device with a transmitter, a determination circuit and a data block size changing circuit.

FIG. 11 shows a radio communication device 1100. The radio communication device 1100 may include a transmitter 1102 configured to transmit data using a data block size. The data block size may be based on a pre-determined maximum data block size. The pre-determined maximum data block size may be pre-determined by another radio communication device. The radio communication device 1100 may further include a determination circuit 1104 configured to determine a quality indicator which is indicative of a quality of the transmission of the data. The radio communication device 1100 may further include a data block size changing circuit 1106 configured to change the data block size to a changed data block size based on the determined quality indicator. The transmitter 1102 may transmit at the changed data block size. The transmitter 1102, the determination circuit 1104, and the data block size changing circuit 1106 may be coupled with each other, for example via a connection 1108, for example an optical connection or an electrical connection, such as for example a cable or a computer bus or via any other suitable electrical connection to exchange electrical signals.

For example, the data block size may be a data block size (for example transport block size; TBS) transmitted in each transmission time interval (TTI).

The radio communication device may include or may be a mobile radio communication device. The other radio communication device may include or may be a radio base station.

Figure 12:
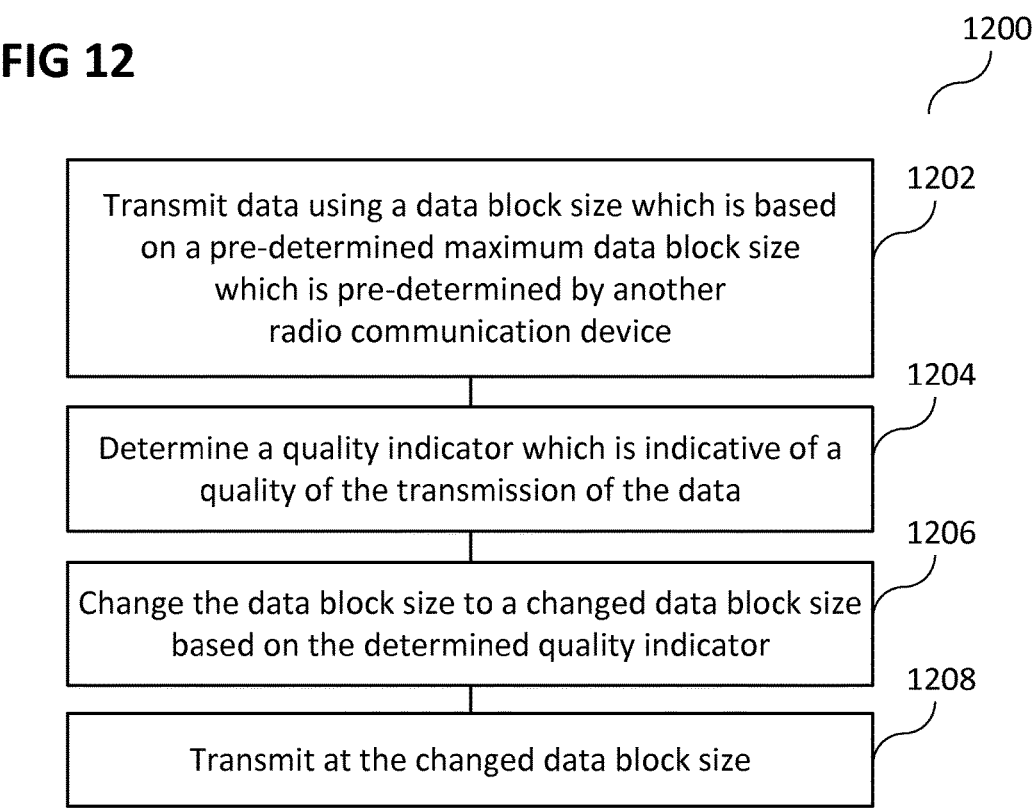
FIG. 12 shows a flow diagram illustrating a method for controlling a radio communication device, for example the radio communication device of FIG. 11.

FIG. 12 shows a flow diagram 1200 illustrating a method for controlling a radio communication device. In 1202, a transmitter of the radio communication device may transmitting data using a data block size. The data block size may be based on a pre-determined maximum data block size. The pre-determined maximum data block size may be pre-determined by another radio communication device. In 1204, a determination circuit of the radio communication device may determining a quality indicator which is indicative of a quality of the transmission of the data. In 1206, a data block size changing circuit of the radio communication device may change the data block size to a changed data block size based on the determined quality indicator. In 1208, the transmitter of the radio communication device may transmit at the changed data block size.

For example, the data block size may be a data block size (for example transport block size; TBS) transmitted in each transmission time interval (TTI).

The radio communication device may include or may be a mobile radio communication device. The other radio communication device may include or may be a radio base station.

Any one of the radio communication devices described above may be a radio communication device configured according to at least one of the following radio access technologies: a Bluetooth radio communication technology, an Ultra Wide Band (UWB) radio communication technology, and/or a Wireless Local Area Network radio communication technology (for example according to an IEEE 802.11 (for example IEEE 802.11n) radio communication standard)), IrDA (Infrared Data Association), Z-Wave and ZigBee, HiperLAN/2 ((HIgh PErformance Radio LAN; an alternative ATM-like 5 GHz standardized technology), IEEE 802.11a (5 GHz), IEEE 802.11g (2.4 GHz), IEEE 802.11n, IEEE 802.11VHT (VHT=Very High Throughput), Worldwide Interoperability for Microwave Access (WiMax) (for example according to an IEEE 802.16 radio communication standard, for example WiMax fixed or WiMax mobile), WiPro, HiperMAN (High Performance Radio Metropolitan Area Network) and/or IEEE 802.16m Advanced Air Interface, a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology (for example UMTS (Universal Mobile Telecommunications System), FOMA (Freedom of Multimedia Access), 3GPP LTE (Long Term Evolution), 3GPP LTE Advanced (Long Term Evolution Advanced)), CDMA2000 (Code division multiple access 2000), CDPD (Cellular Digital Packet Data), Mobitex, 3G (Third Generation), CSD (Circuit Switched Data), HSCSD (High-Speed Circuit-Switched Data), UMTS (3G) (Universal Mobile Telecommunications System (Third Generation)), W-CDMA (UMTS) (Wideband Code Division Multiple Access (Universal Mobile Telecommunications System)), HSPA (High Speed Packet Access), HSDPA (High-Speed Downlink Packet Access), HSUPA (High-Speed Uplink Packet Access), HSPA+(High Speed Packet Access Plus), UMTS-TDD (Universal Mobile Telecommunications System-Time-Division Duplex), TD-CDMA (Time Division-Code Division Multiple Access), TD-CDMA (Time Division-Synchronous Code Division Multiple Access), 3GPP Rel. 8 (Pre-4G) (3rd Generation Partnership Project Release 8 (Pre-4th Generation)), UTRA (UMTS Terrestrial Radio Access), E-UTRA (Evolved UMTS Terrestrial Radio Access), LTE Advanced (4G) (Long Term Evolution Advanced (4th Generation)), cdmaOne (2G), CDMA2000 (3G) (Code division multiple access 2000 (Third generation)), EV-DO (Evolution-Data Optimized or Evolution-Data Only), AMPS (1G) (Advanced Mobile Phone System (1st Generation)), TACS/ETACS (Total Access Communication System/Extended Total Access Communication System), D-AMPS (2G) (Digital AMPS (2nd Generation)), PTT (Push-to-talk), MTS (Mobile Telephone System), IMTS (Improved Mobile Telephone System), AMTS (Advanced Mobile Telephone System), OLT (Norwegian for Offentlig Landmobil Telefoni, Public Land Mobile Telephony), MTD (Swedish abbreviation for Mobiltelefonisystem D, or Mobile telephony system D), Autotel/PALM (Public Automated Land Mobile), ARP (Finnish for Autoradiopuhelin, "car radio phone"), NMT (Nordic Mobile Telephony), Hicap (High capacity version of NTT (Nippon Telegraph and Telephone)), CDPD (Cellular Digital Packet Data), Mobitex, DataTAC, iDEN (Integrated Digital Enhanced Network), PDC (Personal Digital Cellular), CSD (Circuit Switched Data), PHS (Personal Handyphone System), WiDEN (Wideband Integrated Digital Enhanced Network), iBurst, Unlicensed Mobile Access (UMA, also referred to as also referred to as 3GPP Generic Access Network, or GAN standard).

While the invention has been particularly shown and described with reference to specific aspects of this disclosure, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A user equipment device comprising:
    a transmitter configured to transmit data at a data rate having an E-DCH Transport Format Combination Indicator (E-TFCI) based on a pre-determined maximum data rate pre-determined by a base station;
    a determination circuit configured to determine a plurality of quality indicators indicative of a quality of the transmission of the data; wherein the plurality of determined quality indicators comprise a retransmission rate of the transmission of the data and a transmission power of the transmitter; and
    a data rate changing circuit configured to compare each of the plurality of determined quality indicators to a respective quality indicator threshold of a plurality of pre-determined quality indicator thresholds, the data rate changing circuit further configured to change the E-TFCI to a changed E-TFCI if more than one of the plurality of determined quality indicators exceed the respective quality indicator thresholds of the plurality of pre-determined quality indicator thresholds;
    the transmitter further configured to transmit at a changed data rate based on the changed E-TFCI.

2. The user equipment device of claim 1, wherein the maximum data rate is represented by a maximum transmission block size.

3. The user equipment device of claim 1,
    wherein the data rate changing circuit is configured to change the data rate by reducing the data rate if the retransmission rate is above a pre-determined retransmission rate threshold of the plurality of pre-determined quality indicator thresholds.

4. The user equipment device of claim 1,
    wherein the data rate changing circuit is configured to change the data rate by reducing the data rate if the transmission power of the transmitter is above a pre-determined transmission power threshold of the plurality of pre-determined quality indicator thresholds.

5. The user equipment device of claim 1,
    the transmitter further configured to transmit data at a transmission power which is based on a pre-determined maximum transmission power which is pre-determined by a base station;
    the user equipment device further comprising a transmission power changing circuit configured to change the transmission power to a changed transmission power based on the plurality of determined quality indicators;
    the transmitter further configured to transmit at the changed transmission power.

6. The user equipment device of claim 5,
    the transmission power changing circuit configured to reduce the transmission power to the changed transmission power if a transmission power of the transmitter is above a pre-determined transmission power threshold of the plurality of pre-determined quality indicator thresholds.

7. The user equipment device of claim 1,
    wherein the data rate which is based on the pre-determined maximum data rate is further based on an amount of data to be transmitted.

8. The user equipment device of claim 1,
    wherein the data rate which is based on the pre-determined maximum data rate is equal to the pre-determined maximum data rate if the amount of data to be transmitted is above a pre-determined threshold.

9. The user equipment device of claim 1,
    wherein the data rate which is based on the pre-determined maximum data rate is smaller than or equal to the pre-determined maximum data rate.

10. The user equipment device of claim 1, wherein the data rate changing circuit is configured to change the data rate to the changed data rate if a first determined quality indicator of the plurality of determined quality indicators is below a first pre-determined quality indicator threshold of the plurality of pre-determined quality indicator thresholds or if the first determined quality indicator of the plurality of determined quality indicators is above a second pre-determined quality indicator threshold of the plurality of pre-determined quality indicator thresholds.

11. A method for controlling a user equipment device, the method comprising:
    transmitting data at a data rate by a transmitter within the user equipment device;
    wherein the data rate has an E-DCH Transport Format Combination Indicator (E-TFCI) based on a pre-determined maximum data rate pre-determined by a base station;
    determining a plurality of quality indicators indicative of a quality of the transmission of the data by a determination circuit within the user equipment device; wherein the plurality of determined quality indicators comprise a retransmission rate of the transmission of the data and a transmission power of the transmitter;
    comparing each of the plurality of determined quality indicators to a respective quality indicator threshold of a plurality of pre-determined quality indicator thresholds by a data rate changing circuit within the user equipment device;
    changing the E-TFCI to a changed E-TFCI by the data rate changing circuit if more than one of the determined quality indicators exceeds the respective quality indicator thresholds of the plurality of predetermined quality indicator thresholds; and
    transmitting at a changed data rate based on the changed E-TFCI by the transmitter.

12. The method of claim 11,
    wherein the maximum data rate is represented by a maximum transmission block size.

13. The method of claim 11,
    wherein changing the data rate comprises reducing the data rate if the retransmission rate is above a pre-determined retransmission rate threshold of the plurality of pre-determined quality indicator thresholds.

14. The method of claim 11,
wherein changing the data rate comprises reducing the data rate if a transmission power of the transmitter is above a pre-determined transmission power threshold of the plurality of pre-determined quality indicator thresholds.

15. The method of claim 11, further comprising:
transmitting data at a transmission power which is based on a pre-determined maximum transmission power which is pre-determined by a base station;
changing the transmission power to a changed transmission power based on the plurality of determined quality indicators; and
transmitting at the changed transmission power.

16. The method of claim 15, further comprising:
reducing the transmission power to the changed transmission power if a transmission power of the transmitter is above a pre-determined transmission power threshold of the plurality of quality indicator thresholds.

17. The method of claim 11,
wherein the data rate which is based on the pre-determined maximum data rate is further based on an amount of data to be transmitted.

18. The method of claim 11,
wherein the data rate which is based on the pre-determined maximum data rate is smaller than or equal to the pre-determined maximum data rate.

19. The user equipment device of claim 11, further comprising changing the data rate to the changed data rate if a first determined quality indicator of the plurality of determined quality indicators is below a first pre-determined quality indicator threshold of the plurality of pre-determined quality indicator thresholds or if the first determined quality indicator of the plurality of determined quality indicators is above a second pre-determined quality indicator threshold of the plurality of pre-determined quality indicator thresholds.

20. A user equipment device comprising:
a transmitter configured to transmit data using a data block size having an E-DCH Transport Format Combination Indicator (E-TFCI) based on a pre-determined maximum data block size pre-determined by a base station;
a determination circuit configured to determine a plurality of quality indicators indicative of a quality of the transmission of the data; wherein the plurality of determined quality indicators comprise a retransmission rate of the transmission of the data and a transmission power of the transmitter; and
a data block size changing circuit configured compare each of the plurality of determined quality indicators to a respective quality indicator threshold of a plurality of pre-determined quality indicator thresholds, the data block size changing circuit further configured to change the E-TFCI to a changed E-TFCI if more than one of the plurality of determined quality indicators exceed the respective quality indicator thresholds of the plurality of pre-determined quality indicator thresholds;
the transmitter further configured to transmit at a changed data block size based on the changed E-TFCI.

21. The user equipment device of claim 20, wherein the data rate changing circuit is configured to change the data rate to the changed data rate if a first determined quality indicator of the plurality of determined quality indicators is below a first pre-determined quality indicator threshold of the plurality of pre-determined quality indicator thresholds or if the first determined quality indicator of the plurality of determined quality indicators is above a second pre-determined quality indicator threshold of the plurality of pre-determined quality indicator thresholds.

22. A method for controlling a user equipment device, the method comprising:
transmitting data using a data block size having an E-DCH Transport Format Combination Indicator (E-TFCI) based on a pre-determined maximum data block size pre-determined by a transmitter within the user equipment device;
determining a plurality of quality indicators indicative of a quality of the transmission of the data by a determination circuit within the user equipment device; wherein the plurality of determined quality indicators comprise a retransmission rate of the transmission of the data and a transmission power of the transmitter;
comparing each of the plurality of determined quality indicators to a respective quality indicator threshold of a plurality of pre-determined quality indicator thresholds by a data rate changing circuit within the user equipment device;
changing the E-TFCI to a changed E-TFCI by the data rate changing circuit if more than one of the plurality of determined quality indicators exceed the respective quality indicator thresholds of the plurality of pre-determined quality indicator thresholds; and
transmitting at a changed data block size based on the changed E-TFCI by the transmitter.

23. The method of claim 22, further comprising changing the data rate to the changed data rate if a first determined quality indicator of the plurality of determined quality indicators is below a first pre-determined quality indicator threshold of the plurality of pre-determined quality indicator thresholds or if the first determined quality indicator of the plurality of determined quality indicators is above a second pre-determined quality indicator threshold of the plurality of pre-determined quality indicator thresholds.

* * * * *